Sept. 5, 1967
P. F. GIESKING
3,340,394
TRAIN BRAKING SYSTEM
Filed May 13, 1965
3 Sheets-Sheet 1
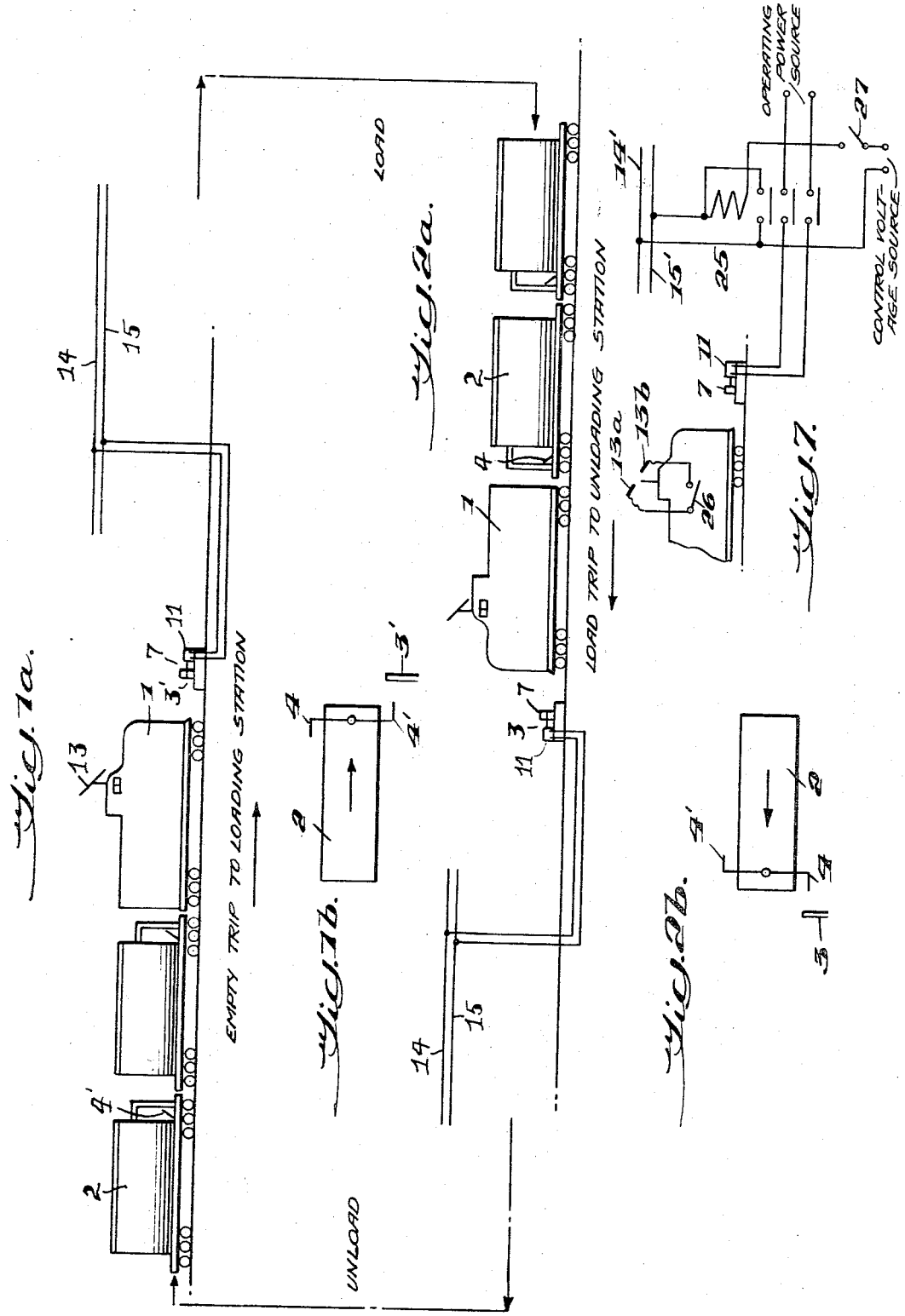

Sept. 5, 1967
P. F. GIESKING
3,340,394
TRAIN BRAKING SYSTEM
Filed May 13, 1965
3 Sheets-Sheet 2
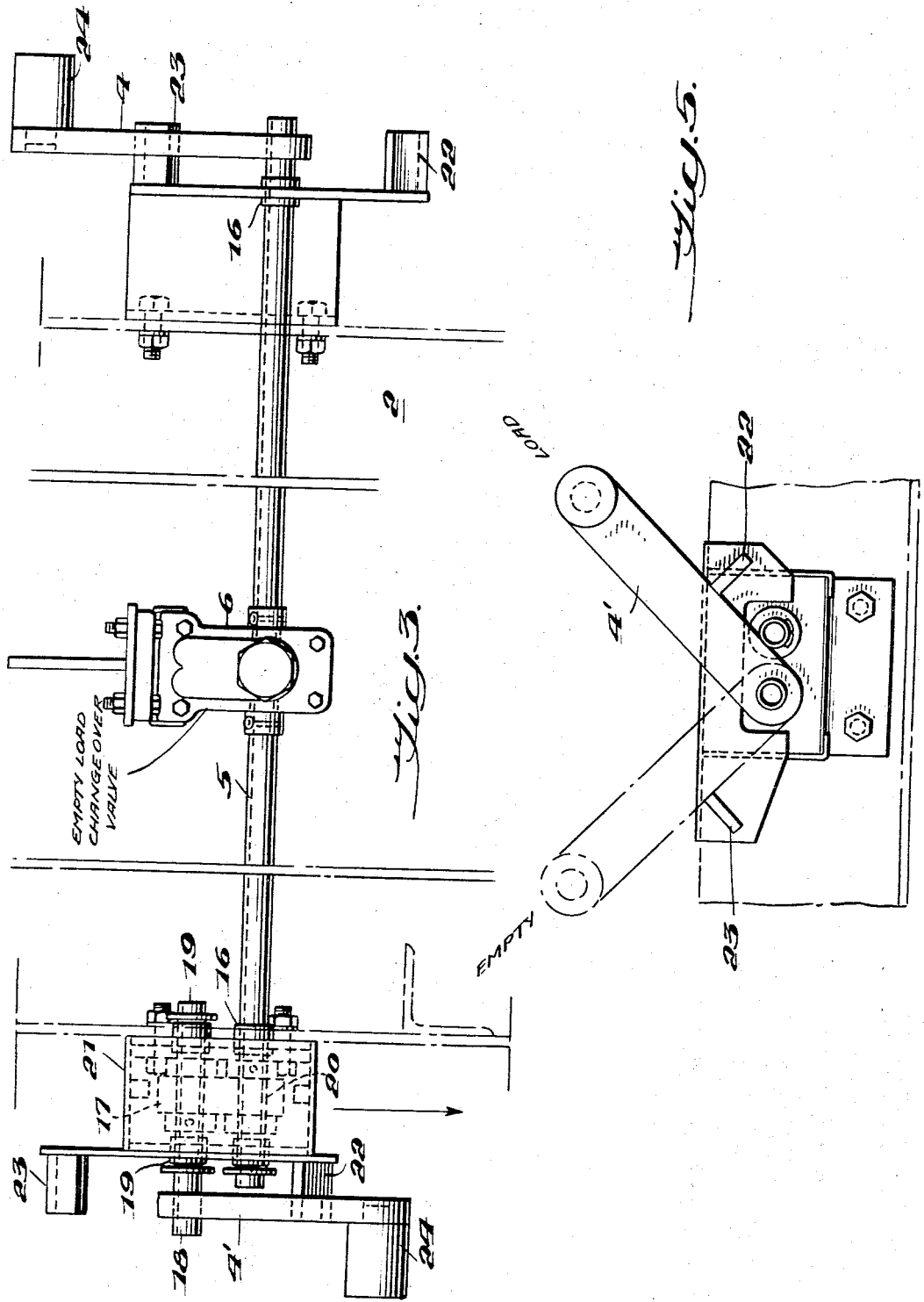

Sept. 5, 1967
P. F. GIESKING
3,340,394
TRAIN BRAKING SYSTEM
Filed May 13, 1965
3 Sheets-Sheet 3
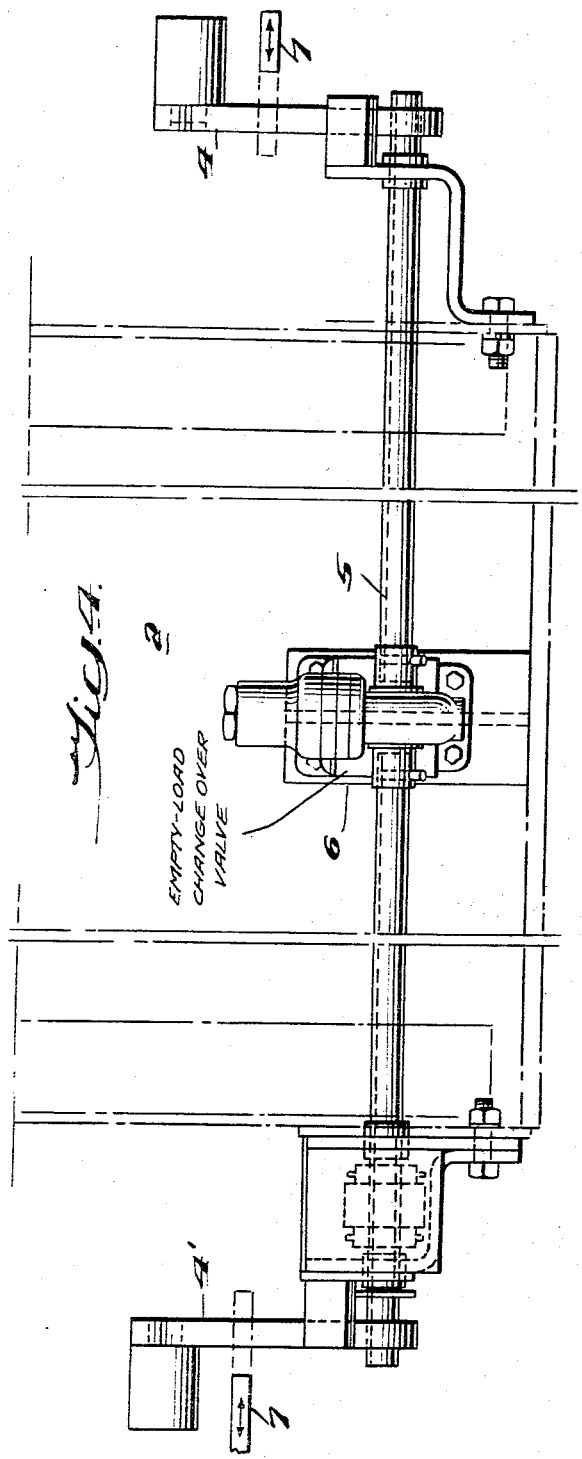
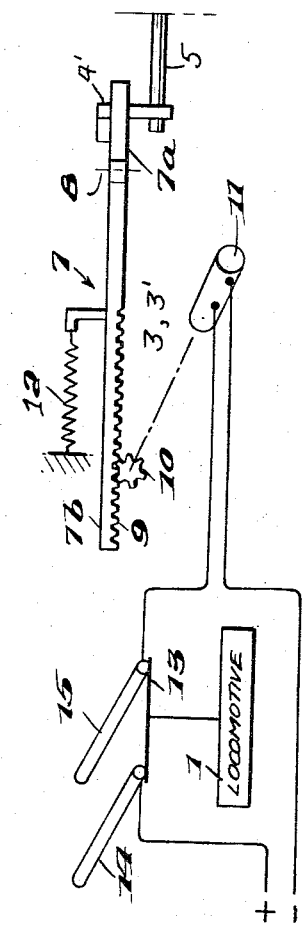

United States Patent Office 3,340,394
Patented Sept. 5, 1967

3,340,394
TRAIN BRAKING SYSTEM
Paul F. Giesking, Sept Iles, Quebec, Canada, assignor to Pickands Mather & Co., Cleveland, Ohio, a corporation of Delaware
Filed May 13, 1965, Ser. No. 455,506
Claims priority, application Canada, Apr. 12, 1965, 928,040
8 Claims. (Cl. 246—200)

This invention relates to brake systems for wheeled vehicles, especially railway vehicles, and more particularly to improvements in air brake systems which include mechanism for adjusting the pressure-applying leverage of the brake rigging according to the load of the vehicle.

It is conventional to include, in the air brake system of a railway vehicle and especially freight cars, a pressure change valve for meeting the change from a loaded to an unloaded condition of the vehicle, and vice versa, i.e. to provide a higher effective brake pressure on a loaded car than on an empty one. It is self-evident that if an optimum braking power be applied to a freight car which is loaded, application of the same power to the brakes of an empty car would result in locking of the wheels causing the wheels to slide and hence, reduce the effective braking action, and also perhaps damage the wheel. The two-position pressure change valve provides two different degrees of braking pressure, namely, a low-pressure position which is adopted for a car when empty and a high pressure position which is adopted for the car when loaded. It is conventional to actuate by manual means such pressure change valves on vehicles so equipped. In the use of such a system, a railroad employee would walk along beside the cars of a standing train and manually turn the operating handle for the valve on each car to the desired position. Then, when the return trip was about to begin, the employee would change the position of each valve handle to suit the new (changed) conditions. Because of the obvious disadvantage of a manually actuated pressure change valve on a braking system, it had been proposed to substitute, for the conventional manually actuated pressure change valve means, a remotely operated electrically actuated system, e.g. an electric system operable from the locomotive of a train of railway cars. While such a substitution has been found to be possible by pneumatic means, it has proved to be so expensive as to be economically unfeasible to equip each such railway car with such control for the pressure change valve. For example, the cost of installation of such a pneumatically controlled system for actuating the pressure change valve of a railway car was found to be about $300.00 per car.

Moreover, the pneumatic control system was characterized by the disadvantage that the locomotive engineer—in order to operate the pressure change valves—perforce must stop the train in order to make the change-over from "empty" to "loaded" (or vice versa) air brake pressure. That is to say, the engineer must deplete the air pressure in the brake pipe to effect the change-over which is ordinarily done by first going to "emergency" and then to release making the change-over. Such a procedure is wasteful of both power and time.

In some cases it is possible to unload, or load, or part load and unload, a train of open-topped bottom hopper-unloading, railway cars while the train continues to move in one direction. Furthermore, the situation sometimes exists wherein the unloading (or loading, or loading and unloading) operation is effectuated by remote control means actuated from the cab of the locomotive (i.e. by the engineer) or by preset wayside control thereby reducing the number of employees necessary for the operation of the train. Under such conditions, it constitutes a loss of operating time to have to stop the train in order to change the air pressure valves from "empty" to "load" and vice versa.

An object of the invention is therefore to provide for automatically changing over the pressure applied by the brake system of a car while the car is moving, the change-over being effected by means of a trackside located actuating device which trips change-over mechanism on the car from one position to another so as to condition the car braking equipment for "empty" or "load" braking.

A more particular object of the invention is to provide a trackside located actuating device which is effective to trip a pressure-change valve of the brake system from one position to another, the particular position of this pressure-change valve being determinative of the maximum amount of braking which can be applied to the car wheels when the car is empty or loaded, respectively.

Still another object of the invention is to provide a trackside located actuating device which is adapted to selectively engage and trip a lever located at each end of a transverse shaft on the car and which, upon rotation in one direction or the other, serves to actuate a brake pressure change-over mechanism of the car braking system from empty to load braking, or vice versa, one of the levers including between it and the rotatable shaft a reversing mechanism so that the shaft may be rotated in the proper direction by either lever to shift the brake pressure change-over mechanism to the desired "empty" or "load" braking condition. This improved arrangement thus makes it possible to change over the braking on a train of cars from either side of the car while the train is moving in the same direction.

These and other inventive objects are realized in a particular embodiment of the present invention which comprises, in addition to a conventional pressure change valve per se in the car braking system, (a) means extending the axis of the pressure change valve to lever-terminal ends protruding externally of the sides of the car; (b) direction-reversing gearing integrated into the axis-extending means; and (c) trackside means for contacting a pressure change valve lever to actuate the pressure change valve. This latter element of the combination may take the form of a trackside pedestal equipped with an extensible-retractable arm at right angles to the track, which arm in an extended position contacts an upwardly extending terminal lever on the moving car, while in retracted position it clears the terminal lever. In the alternative, it may take the form of a lever-throwing member vertically movable into and out of contacting position with respect to a terminal lever on the moving car. In the latter event, the vertically movable lever-throwing member may take the form of a trackside ramp which can be elevated into a lever-contacting position, or the form of a trackside overhead member which can be lowered into a lever-contacting position. In any case, the trackside lever-throwing member is remotely actuable as from the locomotive (or caboose) of the moving train, or from some other desirable locus of operation.

The invention will now be described in greater particularity and with reference to the appended drawings in which:

FIG. 1a is a general lay-out view showing a train of cars after being unloaded and just prior to automatic change-over from load-to-empty braking for the trip back to the re-loading station.

FIG. 1b is a view of one of the cars in the train depicted in FIG. 1a just prior to reaching the trackside located device by which the change-over of the car braking is effected;

FIG. 2a is a general lay-out view similar to FIG. 1a showing the same train of cars after being reloaded and just prior to automatic change-over from empty-to-load braking for the trip to the un-loading station;

FIG. 2b is a view similar to FIG. 1b showing one of the cars in the train depicted in FIG. 1b just prior to reaching the trackside located device by which the change-over of the car braking is effected;

FIG. 3 is a detailed view in top plan of the braking change-over mechanism located at one end of each car in the train.

FIG. 4 is a view in side elevation of the braking change-over mechanism depicted in FIG. 3.

FIG. 5 is a view of one of the actuating lever components of the change-over mechanism as seen from the left in FIG. 3, but drawn to a somewhat larger scale;

FIG. 6 is a schematic view of the track-side device actuating the lever components of the braking change-over mechanism; and FIG. 7 is a fragmentary view of a modified form of the invention.

With reference now to FIGS. 1a, 1b and 2a, 2b in particular, a train comprising a locomotive 1 and a string of freight cars 2 are depicted. In this embodiment, cars 2 are ore cars, e.g., of the type described in my co-pending application Ser. No. 898,081, filed Mar. 17, 1964. These cars are loaded through a longitudinally extending hatchway at the top and are unloaded from the bottom by means of dump doors.

The train plies between an ore loading station and an unloading station which may be several hundred miles apart. For the trip from the loading station to the unloading station, all cars are, of course, filled with ore and the optimum braking force to be applied to each car will, of course, be greater than when the cars are empty. Thus, for the trip in this direction, the braking system on each car is to be set for "load" braking. In accordance with the invention, this braking condition is achieved by means of a track-side located actuating device 3 which engages and trips one of two levers 4, 4' provided on each car, such levers being located respectively at the outer ends of a cross shaft 5 which when rotated serves to shift a change-over valve 6 in the braking system of the car from "empty" to "load" braking. When this valve is in the "load braking" position, a comparatively high braking force will be applied to the wheels of each car when the engineer from his position in the locomotive actuates the control for the central braking system which is of the conventional air brake type. FIG. 2b shows a car just prior to reaching the trackside located actuating device 3 where lever 4 connected to shaft 5 will be shifted in a clockwise direction from the forwardly inclined position depicted to a rearwardly inclined position thus shifting the change-over valve 6 from "empty" to "load" braking. Each of the loaded cars in the train will have its change-over valve 6 shifted from empty to load braking as it passes the actuating device 3 and the train can now proceed to its destination where unloading is to occur. The shift over of valve 6 on each car thus takes place automatically after the train of empty cars has returned to the loading station. The shift over can be made to take place just before or just after the cars are reloaded, the important point being that the braking system on each car is set for load braking before the train gets under way for its run to the unloading station.

After the train reaches its unloading point, and with the train of cars still intact, the cars are unloaded at the dumping point whereupon it then becomes necessary to again shift over the braking on each car from "load" to "empty" for the return run to the loading station. This is also accomplished automatically while the train is moving in a forward direction, and in the same manner that the shift over was made at the loading station. For this purpose another actuating device 3' is located at the side of the track at the unloading station and is adapted to engage and trip the forwardly inclined lever 4' located at the other end of cross shaft 5 in a counterclockwise direction to a rearwardly inclined position thus shifting the change-over valve 6 from "load" to "empty" braking. Thus, each of the cars 2 will have its change-over valve 6 shifted from load to empty braking as it passes the actuating device 3' and the train can now return to its loading station for reloading with the braking system on the train readjusted to supply optimum braking pressure for the wheels on the empty cars.

In the illustrated embodiment of the invention the actuating devices 3, 3' at the loading and unloading stations are of the construction as detailed in FIG. 6, there being an arm 7 movable between a retracted position clear of the trackway and cars and an advanced position at which the forward end portion of the arm intersects the path of travel of the levers 4, 4'. The forward part 7a of this arm is connected to the rearward part by means of a yieldable junction 8 which is necessary in order to permit the forward part to yield in order to pass the lever after swinging it over from the forwardly inclined position to the rearwardly inclined position as shown in FIG. 5. Associated with the rear part 7b of arm 7 is a rack gear 9 meshed with a pinion 10 driven by an electric motor 11. When motor 11 is energized, it causes arm 7 to be advanced from a retracted position to the position shown in FIG. 6 for engagement with lever 4 or 4' as each car passes. When motor 11 is de-energized, arm 7 is returned to its retracted position by means of a position restoring spring 12 which is tensioned when arm 7 is advanced.

Energization and de-energization of motor 11 is controlled automatically in accordance with movement of the train. The arrangement is such that as soon as the locomotive 1 passes by and clears the actuating device 3, a pantograph supported electrically conductive bridging member 13 on the locomotive bridges the gap between a section of parallel spaced overhead conductors 14, 15 and completes an energizing circuit to motor 11 from a suitable power source as depicted schematically in FIG. 6. The conductor section 14, 15 will be of sufficient length to maintain motor 11 energized thereby holding the arm 7 of the actuating device 3 in its advanced lever-contacting position until the last of the cars 2 in the train has passed by it.

If it is not desired to have the conductor section 14, 15 of a length sufficient to ensure that the change-over will operate for all cars in the train, a modified construction according to FIG. 7 can be provided which includes a holding relay 25 connected to a comparatively short section of conductors 14', 15' and which are bridged at the proper time by the bridging member 13 in order to establish a circuit to maintain a current supply to motor 11 for the required length of time. The holding time for the relay 25 will be at least as long as the longest train to be operated.

The bridging member 13 may as shown, be in one piece to close a circuit between the two conductors 14', 15'; or, it may be made in two sections, 13a, 13b as shown in FIG. 7, with a manually operable switch 26 interposed between the two sections to guard against an inadvertent pick-up of the relay. Similarly, another manually operable, safeguard switch 27 may be interposed in the holding relay circuit.

The structural details of levers 4, 4' which actuate shaft 5 which, in turn, actuates pressure change valve 6 from "empty" to "load" braking and vice versa at the loading and unloading stations respectively are shown more clearly in the enlarged scale views of FIGS. 3, 4 and 5. As shown in these views, shaft 5 which extends transversely of the car 2 in opposite directions from the centrally located change-over valve 6 is supported for rotation about its axis in suitable bearing sleeves 16. Secured directly upon one end of shaft 5 is lever 4. The other lever 4' is not secured directly to the opposite end of shaft 5 but rather is indirectly connected with the shaft by means of a reversing gearing which comprises one spur gear 17 secured upon a stub shaft 18 journalled in bearing sleeves 19 and to which lever 4' is secured. Gear 17 meshes with a similar spur gear 20 secured upon shaft 5, the two gears 17 and 20 being located within a housing 21. This reverse gearing is necessary in order to produce the same direction of rotation of shaft 5 as related to action upon the change-over valve 6 for the same direction of rotation of levers 4, 4', and also to make it possible for the lever next to be actuated to be in the proper, forwardly inclined position ready for contact with the actuating arm 7. As is evident from FIG. 3, when lever 4' occupies its "ready" position, i.e., when this lever is inclined forwardly against a front stop 22, lever 4 occupies a rearwardly inclined position against a rear stop 23. As soon as lever 4' is actuated to its rearwardly inclined position against rear stop 23, lever 4 will simultaneously be actuated to its forwardly inclined position to engage its front stop 22 and ready this lever for actuation by arm 7 at the proper time.

As previously explained, rotation of shaft 5 in one direction by lever 4 at the loading station will serve to shift the change-over valve from "empty" to "load" braking, and rotation in the opposite direction by lever 4' at the unloading station will serve to shift valve 5 from "load" to "empty" braking.

If desired, each lever may be provided with a handle 24 to facilitate any manual change-over of the braking that may be required.

The complete air brake system for the train of cars has not been detailed since the present invention is directed only to the novel and automatic means disclosed for shifting the standard change-over valve on such a system between its "empty" and "load" braking positions. Moreover, the type of change-over to be effected by means of valve 6 will depend upon the particular braking structure utilized on the car. If the latter includes a braking pressure control unit commonly known as a "slack adjuster," then the change-over valve 6 can perform the general function of the valving as described in United States Patent No. 2,702,612 to shift the slack adjuster between its "empty" and "load" braking positions. In lieu of a pressure responsive change-over for the car braking as exemplified in the illustrated embodiment of the invention, a mechanically actuated equivalent may be employed such as disclosed in United States Patent No. 2,205,514. Either type thus constitutes a part of the change-over means as defined in the appended claims operable between two positions for conditioning the brake equipment for "empty" or "load" braking.

The specific trackside located actuating device as disclosed may be modified in various ways without departing from the principles of the invention. Thus, for example, the horizontally movable actuating arm 7 can be replaced by a vertically movable arm located above the level of levers 4, 4' and which can be dropped at the proper time into the path of these levers by release of suitable latching means controlled by a solenoid energized in basically the same manner as motor 11.

In conclusion, it will not be evident that the invention, as more particularly defined in the appended claims provides a simple, inexpensive and automatic arrangement for changing over the braking system for an entire train of cars so that optimum maximum allowable braking on each car can be obtained when the car is loaded as well as when it is empty.

Moreover, the invention is not only applicable to a train of standard, rigid cars coupled together in the usual disconnectable manner but also to a train of the type wherein each car is comprised of a plurality of car components permanently articulated together and only one of the car components is provided with means for changing over the individual braking systems of all car components from empty to load braking and vice versa.

I claim:

1. In a system for braking a train of cars and wherein each car is provided with braking means for the wheels controlled from the locomotive and including change-over means on each car operable to set the braking means for load or empty braking, respectively thereby to establish a greater maximum allowable braking force on the wheels when the car is loaded than when empty, and vice versa, the improvement which includes trackside located actuating means engageable with means on each car for tripping the appertaining change-over means from one set position to another as said train moves along the track.

2. A train braking system as defined in claim 1 wherein said trackside located actuating means is comprised of a member movable between a retracted position clear of said tripping means and an advanced position engageable with said tripping means, and means controlled from the locomotive for shifting said movable member of said trackside located actuating means from its retracted to its advanced position.

3. A train braking system as defined in claim 2 wherein said trackside located actuating means is electrically operated and said locomotive controlled means comprises a conductor section extending along the track, said conductor section being connected in a control circuit for said actuating means and being constituted by a pair of spaced conductors adapted to be bridged by a bridging member on the locomotive.

4. A train braking system as defined in claim 1 wherein each said change-over tripping means includes a rotatably mounted shaft extending transversely of the car and a lever at each end thereof, either of which levers is engageable with said trackside located actuating means.

5. A train braking system as defined in claim 4 wherein a lever at one end of said shaft is secured directly thereto and the lever at the opposite end of said shaft is coupled thereto by means of a reversing gearing thereby to obtain the same direction of rotation of said shaft for the same direction of rotation of either lever.

6. In a system for braking a train of cars and wherein each car is provided with braking means for the wheels controlled from the locomotive and including change-over means on each car operable to set the braking means for load or empty braking, respectively thereby to establish a greater maximum allowable braking force on the wheels when the car is loaded than when empty, and vice versa, the improvement which includes a locomotive controlled trackside located actuating means movable between a retracted position clear of the track and an advanced position engageable with means on each said car for tripping the appertaining change-over means from one position to the other as said train moves along the track, said tripping means on each car being comprised of a rotatably mounted shaft extending transversely of the car and a lever at each end thereof either of which is engageable with said trackside located actuating means, a lever at one end of said shaft being secured directly thereto and the lever at the opposite end of said shaft being coupled thereto by means of a reverse gearing thereby to obtain the same direction of rotation of said shaft for the same direction of rotation of either lever, all of said levers on one side of the train of cars occupying a forwardly inclined position while the levers at the opposite side of the cars occupy a rearwardly inclined position, and the forwardly inclined levers on the cars being engageable in succession by said trackside located actuating means and tripped from their forwardly inclined positions to their rearwardly inclined positions.

7. A train braking system as defined in claim 3, in which said bridging member is in one piece to form a closed circuit between said two conductors.

8. A train braking system as defined in claim 3, in which said bridging member is in two parts with a manually operable switch interposed between said two parts.

References Cited

UNITED STATES PATENTS

| 1,075,275 | 10/1913 | Turner | 303—23 |
| 2,374,061 | 4/1945 | Whitney | 303—23 |
| 3,169,803 | 2/1965 | Weber | 303—23 |
| 3,193,333 | 7/1965 | Weber | 303—23 |

ARTHUR L. LA POINT, *Primary Examiner.*

S. B. GREEN, S. T. KRAWCZEWICZ,
*Assistant Examiners.*